March 4, 1924.
O. J. SCHROETER
NUTCRACKER
Filed Nov. 28, 1921
1,485,570
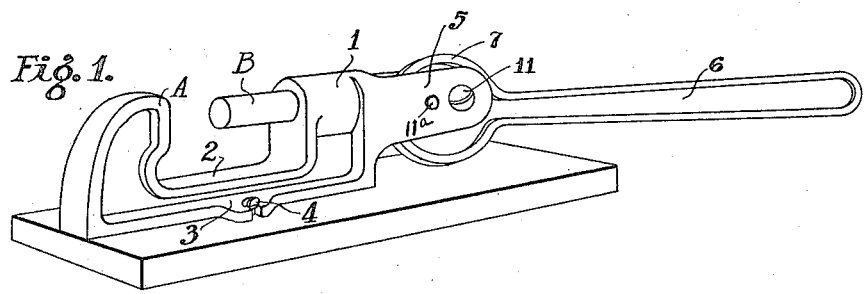
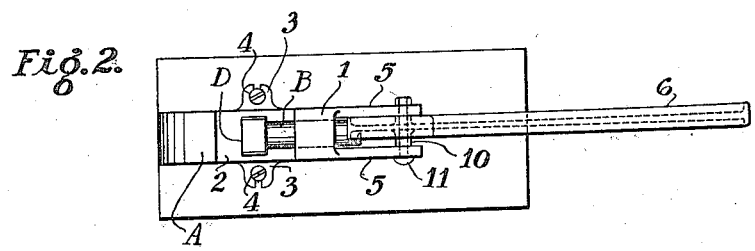
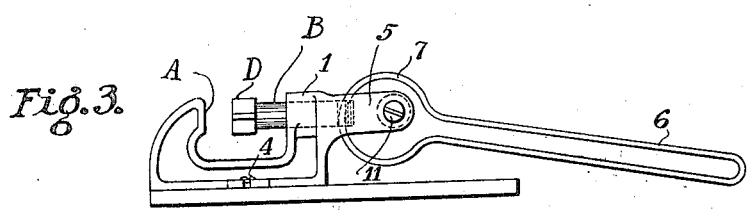
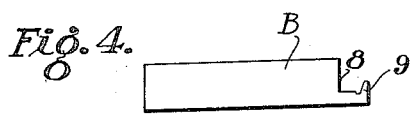  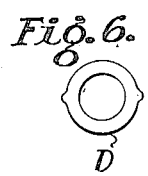 
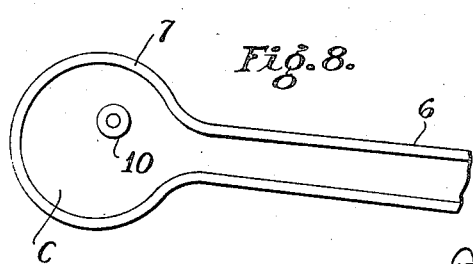
Inventor:
OSCAR J. SCHROETER
by Attorneys Patented Mar. 4, 1924.

1,485,570

UNITED STATES PATENT OFFICE.

OSCAR J. SCHROETER, OF ST. LOUIS, MISSOURI, ASSIGNOR TO SCHROETER BROS. HDW. CO., OF ST. LOUIS, MISSOURI, A CORPORATION OF MISSOURI.

NUTCRACKER.

Application filed November 23, 1921. Serial No. 518,366.

*To all whom it may concern:*

Be it known that I, OSCAR J. SCHROETER, a citizen of the United States, residing at St. Louis, Missouri, have invented a certain new and useful Improvement in Nutcrackers, of which the following is a full, clear, and exact description, such as will enable others skilled in the art to which it appertains to make and use the same.

This invention relates to nut crackers, and has for its main object to provide an inexpensive nut cracker of simple design that will effectively crack hard shelled nuts, such as black walnuts.

Another object is to provide a powerful nut cracker that is easy to operate and which is so constructed that the nut being cracked can be held in the user's fingers without liability of pinching or injuring the user's fingers. Other objects and desirable features of my invention will be hereinafter pointed out.

Figure 1 of the drawings is a perspective view of a nut cracker constructed in accordance with my invention.

Figure 2 is a top plan view of same.

Figure 3 is a side elevational view of said nut cracker.

Figures 4 and 5 are a side elevational view and an end view, respectively, of the movable member of the device.

Figures 6 and 7 are an end view and a side elevational view, respectively, of the adapter that is used when small nuts are being cracked; and Figure 8 is a side elevational view of the eccentric that is used for actuating the movable member of the device.

Referring to the drawings which illustrate the preferred form of my invention, A and B designate a stationary member and a movable member, respectively, between which a nut is adapted to be arranged and cracked by the pressure exerted on same by said members. The stationary member A is preferably formed by an integral portion of a substantially yoke-shaped casting that is provided with an integral guide 1 in which the movable member B is reciprocatingly mounted, and the base portion 2 of said casting which joins the portions A and 1 together is preferably provided at a point intermediate its ends with laterally-projecting lugs 3 through which screws or other retaining devices 4 can be passed so as to secure the casting to a supporting structure.

The means that is used for actuating the movable member B consists of an eccentric C mounted between a pair of lugs 5 on the said casting and provided with an integral handle 6, said eccentric being operatively connected with the movable member B in such a manner that rotary movement of said eccentric in one direction moves the member B towards the member A, and rotary movement of said eccentric in the opposite direction moves the member B away from the member A. In the form of my invention herein illustrated the eccentric C is provided at one side with a laterally-projecting flange 7 whose periphery bears against the outer end 8 of the movable member B and whose inner side is engaged by a hook 9 on the outer end of the movable member B. When the lever 6 of the eccentric C is in an elevated position, the inner end of the member B will be spaced far enough away from the member A to permit a large sized nut to be positioned between said members. To crack the nut it is only necessary to swing the handle 6 downwardly into the position shown in Figure 1, as this movement of the handle causes the periphery of the flange 7 on the eccentric C to bear against the end 8 of the member B and move said member towards the member A, thus exerting sufficient pressure on the nut to crack the shell of same. Thereafter, the handle 6 is swung upwardly so as to cause the hook 9 to cooperate with the inside surface of the flange 7 to restore the movable member B to its former position. The eccentric C is so designed that the member B only has a limited movement,— never great enough to cause the member B to engage the member A, and consequently, it is impossible for the device to pinch or injure the fingers of the user's hand in which the nut is held during the operation of cracking the nut.

While the particular shape of the various elements of the device and the means that is used for operatively connecting the actuating member C with the movable nut engaging member B is immaterial, so far as my broad idea is concerned, I prefer to make the various elements of the device of substantially the form herein illustrated, as such a design makes it possible to construct a powerful nut cracker from a few inexpensive castings that require very little machining. Thus, the main frame of the device, which comprises the stationary nut engaging member A, the guide 1, and the lugs 5 on which the eccentric is mounted is preferably formed by a single casting, the eccentric C and the integral handle 6 thereon are formed by a separate casting, the movable nut engaging member B is formed by a piece of round rod having a portion cut away at one of its ends so as to form a hook-shaped projection 9 thereon and the guide 1 in which the nut engaging member B reciprocates is made long enough to prevent said member from tilting or moving in other than a straight line. The eccentric C is provided at one side with a flat face that bears against the inside face of one of the lugs 5, and on the opposite side of the web of said eccentric is an integral, laterally-projecting hub 10 whose end bears against the inside face of the other lug 5, the eccentric being oscillatingly mounted between the lugs 5 on a bolt or other suitable device 11 that passes transversely through said parts. The width of the flange 7 on the eccentric C is less than the width of the space between the lugs 5, as shown in Figure 2, thus providing a space between the edge of said flange and the lug 5 that is disposed oppositely to same for receiving the hooked projection 9 on the end of the movable member B that cooperates with the flange on the eccentric to retract the movable nut engaging member of the device when the operating handle 6 of the eccentric is swung in one direction. In order that the device may be used for cracking large and small nuts, the lugs 5 may be provided with two sets of holes for receiving the bolt 11 on which the eccentric C is oscillatingly mounted, said holes being arranged different distances from the member A so that the bolt 11 can be arranged in the holes farthest away from the member A when it is desired to crack large nuts, or in the holes located nearer to the member A when it is desired to crack small nuts. Or, if desired, the lugs 5 can be provided with a single set of holes for the bolt 11 and an adapter D consisting of a cap piece can be mounted on the inner end of the member B, as shown in Figures 2 and 3, when it is desired to use the device for cracking small nuts. After the members of the device have been assembled it will be impossible for the nut engaging member B to become disengaged from the eccentric. Moreover, as only one fastening device, namely, the bolt 11 is required to retain the actuating member C in operative position and hold said actuating member in operative relationship with the movable nut engaging member B of the device, the cost of assembling the parts of the device is negligible.

Having thus described my invention, what I claim as new and desire to secure by Letters Patent is:

A nut cracker, comprising a frame composed of a casting having a horizontally-disposed base provided at one end with a stationary, upwardly-projecting nut engaging member that has a vertically-disposed face against which a nut is adapted to be held, an integral, tubular guide on said base disposed in longitudinal alignment with said nut engaging member, a pair of lugs projecting rearwardly from said guide above said base, an eccentric pivotally mounted between said lugs on a horizontal pin and provided at one side with a hub that bears against the inner vertical side face of one of said lugs, an integral operating handle on said eccentric, a laterally-projecting flange on one side of said eccentric, and a horizontally-disposed reciprocating member in said guide formed from a piece of round rod cut away at one end so as to produce a hooked projection and a bearing face that are engaged by the flange on the eccentric during the operation of actuating said eccentric, said guide being of sufficient length to insure said reciprocating member moving in a straight line when said eccentric is oscillated.

OSCAR J. SCHROETER.